(12) United States Patent
Esbensen et al.

(10) Patent No.: US 12,018,653 B2
(45) Date of Patent: Jun. 25, 2024

(54) ROTOR BLADE DEFLECTION CONTROL USING ACTIVE ROTOR BLADE ADD-ON

(71) Applicant: Siemens Gamesa Renewable Energy A/S, Brande (DK)

(72) Inventors: Thomas Esbensen, Herning (DK); Gustav Hoegh, Vejle (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/007,782

(22) PCT Filed: May 26, 2021

(86) PCT No.: PCT/EP2021/064001
§ 371 (c)(1),
(2) Date: Dec. 2, 2022

(87) PCT Pub. No.: WO2021/249773
PCT Pub. Date: Dec. 16, 2021

(65) Prior Publication Data
US 2023/0250800 A1 Aug. 10, 2023

(30) Foreign Application Priority Data
Jun. 10, 2020 (EP) .................... 20179269

(51) Int. Cl.
*F03D 7/02* (2006.01)

(52) U.S. Cl.
CPC ...... *F03D 7/0232* (2013.01); *F05B 2270/326* (2013.01); *F05B 2270/33* (2013.01);
(Continued)

(58) Field of Classification Search
CPC ...... F03D 7/0232; F03D 7/0236; F03D 7/022; F03D 7/0228; F03D 7/0237;
(Continued)

(56) References Cited

U.S. PATENT DOCUMENTS

| 8,131,402 B2 * | 3/2012 | Neumann | F03D 1/0675 416/61 |
| 2008/0101930 A1 * | 5/2008 | Bosche | F03D 7/0224 416/61 |

(Continued)

FOREIGN PATENT DOCUMENTS

| CN | 110939549 A | 3/2020 |
| EP | 2598750 A2 | 6/2013 |

(Continued)

OTHER PUBLICATIONS

PCT International Search Report and Written Opinion of International Searching Authority dated Jun. 24, 2021 corresponding to PCT International Application No. PCT/EP2021/064001 filed May 26, 2021.

*Primary Examiner* — Brian P Wolcott
*Assistant Examiner* — Maxime M Adjagbe
(74) *Attorney, Agent, or Firm* — Schmeiser, Olsen & Watts LLP

(57) ABSTRACT

A method of controlling at least one adaptable airflow regulating system, in particular spoiler and/or flap, of at least one rotor blade of a wind turbine having a wind turbine tower includes: determining a quantity related to a distance between the rotor blade and the wind turbine tower; controlling the airflow regulating system based on the quantity.

14 Claims, 2 Drawing Sheets

Figure 1:
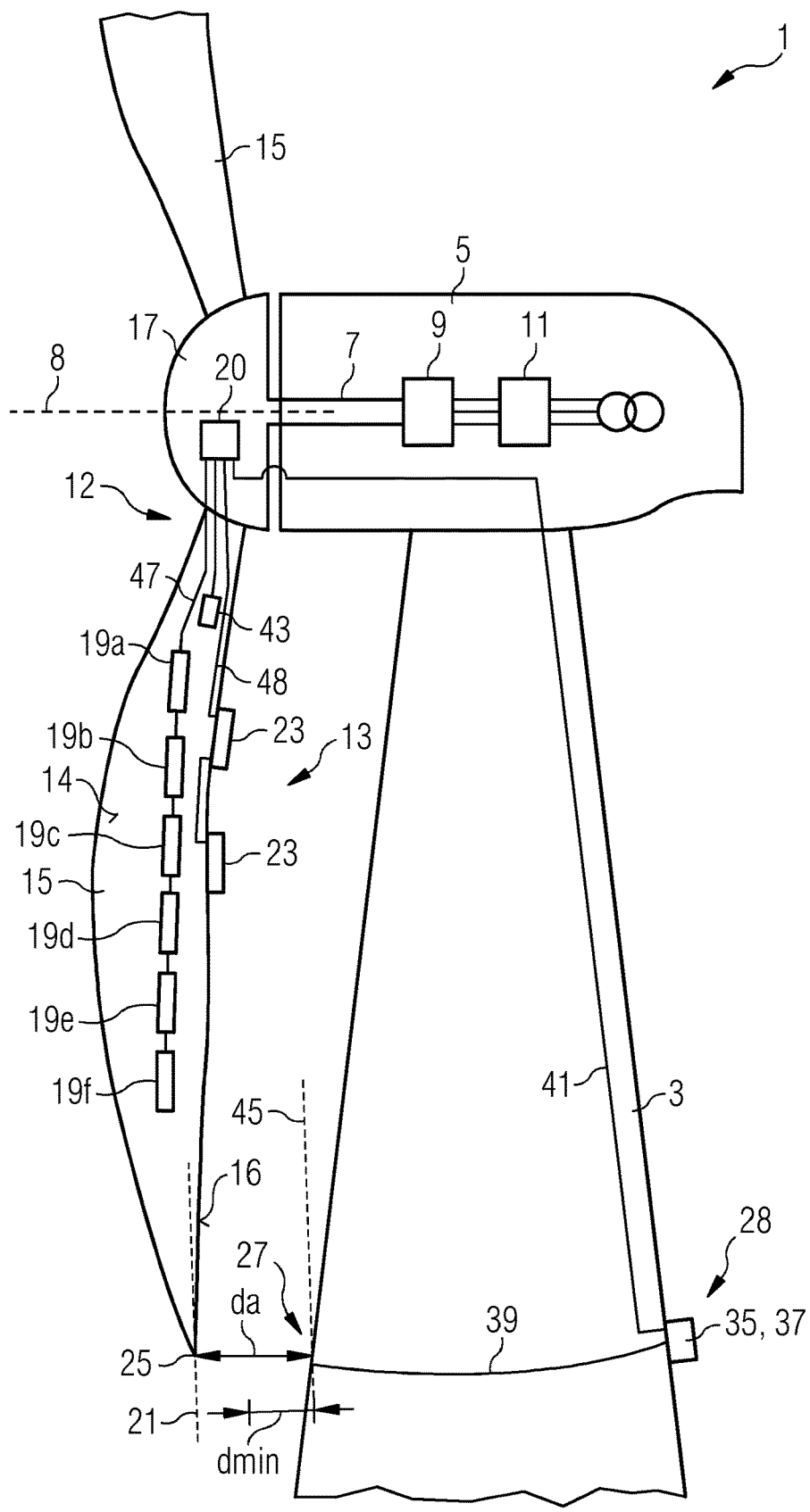

(52) U.S. Cl.
CPC . *F05B 2270/8042* (2013.01); *F05B 2270/805* (2013.01); *F05B 2270/807* (2013.01); *F05B 2270/808* (2013.01)

(58) Field of Classification Search
CPC .. F03D 7/0239; F03D 1/06495; F03D 1/0685; F03D 17/028; F03D 17/034; F05B 2270/8042; F05B 2270/805; F05B 2270/807; F05B 2270/808; F05B 2240/3052

See application file for complete search history.

(56) References Cited

U.S. PATENT DOCUMENTS

| | | | | |
|---|---|---|---|---|
| 2010/0084864 | A1* | 4/2010 | Lucks | F03D 7/0288 290/44 |
| 2011/0135466 | A1* | 6/2011 | Latorre | F03D 17/00 416/61 |
| 2015/0147172 | A1* | 5/2015 | Chacon | F03D 7/0224 416/1 |
| 2018/0171984 | A1 | 6/2018 | Vincent et al. | |

FOREIGN PATENT DOCUMENTS

| | | |
|---|---|---|
| EP | 2885531 A2 | 6/2015 |
| WO | 2020057917 A1 | 3/2020 |

\* cited by examiner

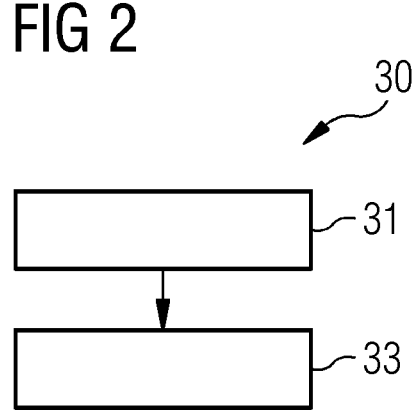

ROTOR BLADE DEFLECTION CONTROL USING ACTIVE ROTOR BLADE ADD-ON

CROSS-REFERENCE TO RELATED APPLICATIONS

This application claims priority to PCT Application No. PCT/EP2021/064001, having a filing date of May 26, 2021, which claims priority to EP Application No. 20179269.4, having a filing date of Jun. 10, 2020, the entire contents both of which are hereby incorporated by reference.

FIELD OF TECHNOLOGY

The following relates to a method and an arrangement for ensuring that a clearance between a rotor blade and the wind turbine tower is above a predetermined minimal clearance during operation. Thereby, the following proposes a method and an arrangement of controlling at least one adaptable airflow regulating system of at least one rotor blade of a wind turbine having a wind turbine tower. Furthermore, the following relates to a wind turbine comprising the arrangement.

BACKGROUND

A wind turbine comprises a wind turbine tower, a nacelle mounted on top of the wind turbine tower, wherein the nacelle harbours a rotor at which plural rotor blades are connected. During operation of the wind turbine, the rotor blades rotate in a rotor plane perpendicular to the rotation axis of the rotor shaft. Upon operation, the risk occurs, for example due to changing wind conditions or other operating parameters, that the rotor blades collide with the wind turbine tower.

Conventionally, in order to ensure blade tip to tower clearance, a blade design involves a trade-off between lighter/cheaper/softer/longer blades that can deflect significantly and heavier/expensive/stiffer/shorter blades that deflect less. Turbine operational parameters such as tilt angle, coning angle, center of gravity further impacts the blade tip to tower clearance (also referred to as blade tip to tower axial distance).

Conventionally, blade tip to tower axial distance is typically a design driver for wind turbines. Design load cases (DLCs) may be in place to evaluate a turbine design in simulation to ensure that a turbine design complies to particular blade tip to tower clearance constraints. Typically, larger blade deflection (smaller clearance) may be seen at extreme events such as wind gust and operation at negative wind shear.

Conventionally, components can be designed to comply to clearance constraints. The conventional controller may have the functionality to unload the turbine when there is a risk of higher deflection. Conventionally, this may involve pitching the blades. Conventionally, the controller may be tuned conservatively to sacrifice performance but may allow better tip to tower clearance.

It has been observed, that pitching the blades to ensure a particular minimal axial distance between the rotor blades and the tower does not in all situations provide reliable and safe operation. Furthermore, applying pitching the blades may have a negative impact on the lifetime of the pitching equipment. In particular, the load on bearings in the pitching system may be relatively high due to a high number of pitching actions. Furthermore, pitching may not be fast enough to appropriately control the clearance to stay in acceptable range.

Thus, there may be a need for a method and a corresponding arrangement for ensuring that a predetermined minimal distance between a rotor blade and the wind turbine tower is maintained, thereby prohibiting impact between the blade and the wind turbine tower. In particular, there may be a need to ensure a blade tip to tower clearance at any operating condition and external event to be above a minimal clearance.

SUMMARY

According to an embodiment of the present invention, it is provided a method of controlling at least one adaptable airflow regulating system (also referred to as add-on, e.g. lift regulating means, e.g. comprising an aerodynamically active surface changeable in position and/or orientation relative to an outer airfoil of the blade), in particular spoiler and/or flap, of at least one rotor blade of a wind turbine having a wind turbine tower (in particular for controlling blade deflection and/or tower clearance). Thereby the method comprises determining a quantity related to a (e.g., actual and/or future) distance between the rotor blade and the wind turbine tower; and controlling the airflow regulating system based on the quantity. Thereby controlling the airflow regulating system comprises: adapting the airflow regulating system such that an aerodynamic lift in at least a portion of the rotor blade is decreased, if the quantity is below a first threshold. The method comprises, if the distance related quantity is below a second threshold: additionally controlling an airflow regulating system of at least one further rotor blade based on the distance related quantity, wherein the second threshold is smaller than the first threshold.

The method may partly be implemented in software and/or hardware. The method may for example be performed (in part) by a software module of a wind turbine controller. The adaptable airflow regulating system may comprise one or more components which are arranged at or close to airfoil portions of the rotor blade. The airflow regulating system may for example comprise a spoiler, which may in particular comprise several segments which may be arranged along a longitudinal direction of the rotor blade, for example at a suction side of the rotor blade airfoil. Furthermore, alternatively or additionally, the airflow regulating system may comprise one or more flaps which are for example mounted close to or at a trailing edge of the rotor blade.

The airflow regulating system is adaptable in the sense that the aerodynamic properties of the airflow regulating system, in particular in conjunction with the airfoil portions of the rotor blade, is changeable. For example, the lift force or thrust force to which the rotor blade is subjected to when wind impacts on it and when it rotates, may be changeable due to particular adaptation of the airflow regulating system. Thereby, the airflow regulating system may be set in one or more different states. For example, when the airflow regulating system comprises a number of segments, those individual segments may be individually controlled to be in an off-state or an on-state involving for example changing position and/or orientation of at least one active surface portion relative to the rotor blade airfoil. In other embodiments, the adaptation may be in a continuous manner, in that at least one active surface portion may be continuously changed in orientation and/or position relative to the rotor blade airfoil. The airflow regulating system may also be referred to as an active add-on.

For adapting the airflow regulating system, meaning setting it into different states, for example a pneumatic system may be utilized. In one embodiment, the airflow regulating system may comprise a spoiler which may be placed on a suction side of the rotor blade. The airflow regulating system may also comprise one or more vortex generators, for example placed in the streamline behind the spoiler as seen from the leading edge. The spoiler or spoilers may be activated using a pressure hose placed under the active surface (such as a flap) which upon inflation of air being pushed into the hose may cause the active surface to rise above the blade surface. When the spoiler or spoilers are activated, for example tilted upwards to protrude from the rotor blade airfoil, a quick reduction of the blade load (and thus aerodynamic lift force) may be effected by initiating at least a localized stall on the airflow across the rotor blade.

By adapting the airflow regulating system (for example setting it in one or more of different states), the lifting force of the combination of the rotor blade airfoil and the adapted airflow regulating system may be changed. In turn, when the lifting force is for example reduced, the deflection of the rotor blade is also reduced.

The "quantity related to the distance" between the rotor blade and the wind turbine tower does not necessarily be the (axial) distance between the rotor blade and the wind turbine tower. However, the (axial) distance between the rotor blade and the wind turbine tower may be derivable from the "quantity related to the distance".

The quantity related to the distance between the rotor blade and the wind turbine tower may e.g., be or relate to a (axial) distance between two reference objects or reference locations, one on the rotor blade and another on the tower. E.g., a small item (e.g., sensor or reference sticker etc, such as detectable by RADAR or LIDAR) may be placed on the tower. The distance between this item and the blade (tip) may be determined (e.g., by a measurement) and the control may be based on this item-blade distance (and/or the derived blade-tower distance). By geometrical considerations the (axial) distance between (e.g., a front location of) the tower and the blade may be calculated.

The quantity related to the distance between the rotor blade and the wind turbine tower may be related to a may be for example be the (axial) distance, for example measured along an axial direction parallel to the rotation axis of the rotor at which the rotor blade is connected. The distance may in other embodiments also be related to an actual distance between the three-dimensional position for example of a rotor blade tip and a point on the outer surface of the wind turbine tower. The axial distance (i.e., the distance between the particular portion of the rotor blade, in particular the tip, and the wind turbine tower as measured along the axial direction parallel to the rotation axis of the rotor) may be derived from the distance as defined by the Euclidian distance between two three-dimensional points or from the coordinates of the three-dimensional points. In other embodiments, the quantity related to the distance may for example be or comprise a deflection of the rotor blade, for example a deflection of the tip of the rotor blade out of a rotation plane which may be defined as a plane perpendicular to the rotor and being intersecting a root section of the rotor blade. In still other embodiments, the quantity may for example relate to a strain value measured within the rotor blade for example. From the strain value for example the deflection may be derivable from which in turn the distance, in particular the axial distance, between the rotor blade and the wind turbine tower may be derivable.

For determining the quantity, measurement values and/or estimated values may be used. For determining the quantity, different geometry related pregiven data relating for example to the rotor blade length, the material properties of the rotor blade, the distance between the rotor blade and the tower in an unloaded situation may be utilized. Determining the quantity may involve performing several arithmetic logical operations, for example by a processor, applied to the measurement values and/or estimated values and/or the other parameters.

The determined quantity may indicate the axial distance or the axial distance may at least be derived based on the quantity. In the following, the term "distance" may refer to the distance between a rotor blade portion and a portion of the wind turbine tower. In particular, it may relate to the distance between the rotor blade tip and a front portion of the wind turbine tower. The term "axial distance" may refer to the axial distance between the rotor blade portion and the wind turbine tower portion.

Determining the quantity may precede controlling the airflow regulating system. In particular, the quantity may be determined before the considered wind turbine blade will pass the tower. Passing the tower may occur, when the wind turbine rotor blade may approach the wind turbine tower to a smallest distance along or across its whole revolution within the rotation plane.

The distance and/or the axial distance may be determined at a point in time before the rotor blade passes the tower. From the value of the distance or axial distance at this point in time, the distance and/or axial distance of it at the point in time when the rotor blade passes the wind turbine tower may be derived. According to an approximation in an embodiment, the distance and/or the axial distance as determined at the point in time before passing the tower may be assumed to be maintained also to be applicable to the point in time when the wind turbine rotor blade passes the wind turbine tower. The point in time when the rotor blade passes the wind turbine tower may be referred to as 'crossing point in time'. Controlling the airflow regulating system may be performed before the crossing point in time. Thereby, it may be ensured that the wind turbine blade does not collide with portions of the tower. According to embodiments of the present invention, the airflow regulating system may be controlled based on the quantity only in a particular azimuth range just before and just after the crossing point in time. Thereby, efficiency of the wind turbine may be improved while at the same time ensuring a minimal distance between the rotor blade and the wind turbine tower.

The control target used in the method may exactly be the (minimum) (in particular axial) distance between blade tip and tower, which is evaluated when the blade is exactly in front of the tower (rotor azimuth angle causing blade to point straight down). However, since there is some delay in controlling the active add-on (e.g., a small opening/activation delay of 0.1-2 seconds) and since blade aerodynamics does not change momentarily, the control action is initiated before the blade reaches the critical position (i.e., crossing point in time). The method may react "before" the passing moment, e.g., one blade or even one revolution ahead, or some phase margin before, and predict the expected distance for the crossing point in time.

The axial distance (e.g., between the plane of the rotor/blade and the tower) may be the control target (not to cause collision), but the method needs to react before, so e.g., a distance or estimate of distance prior to the passing moment (e.g. at another or previous location than when the blade is pointing straight down) may be used to infer the distance at the crossing point in time.

Controlling the airflow regulating system may for example comprise sending appropriate control signals to a pneumatic system which upon receiving the signals may generate pneumatic pressure in order to inflate (or deflate) for example a hose which is, upon inflation or deflation, moving an active surface portion, for example in case of a spoiler. When the airflow regulating system comprises several segments, different individual control signals may be supplied to the individual segments of the airflow regulating system. For example, different segments may be controlled in a different manner. One or more may be turned on (involving tilting out respective active surface) and one or more other may be turned off. The control may be such that the lifting force due to aerodynamics or due to the airflow is reduced to such an extent that a minimal predetermined distance is ensured between the rotor blade and the wind turbine tower.

Thereby, a fast method for controlling the deflection or controlling the distance (or clearance) between the rotor blade and the wind turbine tower may be provided. Furthermore, load on pitching bearings may be reduced. In particular, when the method is performed the pitch angle may (at least temporarily) be kept unchanged, i.e., constant.

For example, when activating a segment of a segmented spoiler provided at a suction side of the rotor blade, the airflow may at least portion-wise be disturbed, to effect a stall of the airflow. Thereby, the lifting force by the airflow streaming across the rotor blade airfoil including the active surface of the flow regulating device may decrease. Thereby, the distance, in particular axial distance, may be kept above the predetermined minimum distance. If the quantity is not below the first threshold, there may be no control of the airflow regulating system necessary, since the distance as determined is not smaller than the predetermined minimum distance. Thereby, energy production may continue and efficiency may be improved compared to conventional methods.

Adapting the airflow regulating system may be such that the smaller the distance related quantity the more lift is reduced, e.g., inversely proportional.

The second threshold is smaller than the first threshold. Thus, when it is determined that the distance is below the second threshold, the deflection of the rotor blade is relatively strong so that also for one or more other wind turbine blades, the risk will occur to cross the tower at a too close distance or even collide with the tower. Therefore, it may be advantageous to already control respective airflow regulating systems on one or more other wind turbine blades which will come close to the tower after the first considered rotor blade has passed the tower. This kind of control may also be referred to as a collective control of plural wind turbine blades or regulating systems on wind turbine blades.

According to an embodiment of the present invention the distance related quantity is obtained by at least one measurement and/or at least one estimation and/or wherein the distance relates to an axial distance between a tip of the blade and the tower, the axial distance being taken along an axial direction of a wind turbine rotor at which the rotor blade is mounted, wherein the distance relates in particular to a point in time, when the blade passes the tower (i.e. when the tip of the blade points downwards and a longitudinal axis of the blade is substantially parallel to a longitudinal axis of the tower).

Measurement and estimation may be combined for determining the quantity. In particular, different measurement values from different sensors may be utilized or combined and the estimation may take into account these different measurement values for determining the quantity. When the axial distance is zero, the rotor blade tip would just touch the outer wall of the wind turbine tower. In order to ensure a reliable and safe operation, the axial distance may be requested to be larger than a minimum value. This criterium may only apply at the crossing point in time. When not at the crossing point in time, the (axial) distance may even be smaller than the minimal (axial) distance. According to an embodiment of the present invention, the axial distance at other times than the crossing point in time, is actually lower than the minimal distance as predetermined and given by the operating instructions of the wind turbine. Thereby, the efficiency of the wind turbine may be improved while ensuring to prohibit an impact between the blade and the tower. The tip of the rotor blade may be the portion (e.g., longitudinal end) of the rotor blade which is by the farthest distance away from the blade root.

According to an embodiment of the present invention, the measurement involves at least one of: measuring a distance between a portion of the blade and a portion of the tower; measuring a deflection of the rotor blade in at least one portion of the rotor blade, wherein the measuring is based on RADAR and/or LIDAR and/or strain measurement and/or acceleration measurement.

A measurement may for example be performed by an optical or electromagnetic method, equipment partly installed at the blade and/or the tower and/or the nacelle. The deflection may for example be measured by evaluating signals from one or more acceleration sensors and/or strain sensors placed or arranged on or at the rotor blade surface or internally. Thereby, conventionally available measurement techniques may be supported for simply and reliably determining the quantity involving a measurement.

According to an embodiment of the present invention, the estimation involves at least one of: estimating a deflection of at least one portion, in particular a blade tip, of the blade based on at least one measurement result, in particular blade strain and/or acceleration; estimating a distance between a portion of the blade and a portion of the tower based on at least one measurement result and/or estimation result, in particular deflection of the blade in at least one portion and/or blade root moment.

The deflection may be given as a deviation of a design shape of the blade from the actual shape of the blade. The deflection may for example be given as an angle relative to a blade root or as an entire shape of a curve of the rotor blade. In other embodiments, the deflection may be given as a deviation of the axial position of the rotor blade tip from a design axial position of the rotor blade tip. Using geometric considerations, the distance and in particular also the axial distance may be derived from the deflection and/or one or more other measurements or estimations. For estimating physical and/or mathematical models may be utilized taking into account for example the material from which the rotor blade is manufactured and/or blade geometry.

According to an embodiment of the present invention, determining the distance related quantity comprises: measuring the distance related quantity for a first point in time; predicting the distance related quantity for a second point in time, in particular when the rotor blade passes the tower, based on the distance related quantity as measured for a first point in time; wherein controlling the airflow regulating system comprises: controlling, before the second point in time, the airflow regulating system based on the quantity as predicted for the second point in time.

The second point in time may therefore be the crossing point in time. The first point in time may be earlier than the second point in time. When the airflow regulating system is controlled before the second point in time, the lift force may be changed, in particular reduced, to effectively prohibit such a big deflection that the risk of an impact of the blade and the tower occurs. In particular, it may be ensured that the minimal (axial) distance is not undercut.

The time range between the first point in time and the second point in time may for example amount to between 0.1 s and 10 s.

According to an embodiment of the present invention, the at least one measurement and/or the at least one estimation relates to the rotor blade being positioned within a predetermined rotor azimuth angle range, in particular having angle width between 90° and 180°, in the moving direction of the blade before the tower.

When the measurement and/or the estimation relates to the rotor blade being positioned within the predetermined rotor azimuth angle range, the determination of the quantity related to the distance may be more reliable and/or more accurate. For example, when the rotor blade stands upright, the experienced wind conditions may be significantly different from the wind turbine blade being pointing downwards, i.e., just crossing the tower. Taking measurement values in a range relatively close to the crossing situation may improve the reliability and accuracy of the determined quantity. In turn, the controlling may be improved. Other angle widths for example between 60° and 100° may also be provided.

According to an embodiment of the present invention, determining the distance related quantity comprises: measuring a blade deflection, when the blade is within the predetermined rotor azimuth range, and estimating the distance between a tip of the blade and the tower, at the point in time when the blade tip passes the tower, based on the blade deflection measured earlier.

The deflection may for example be estimated from one or more acceleration measurement results or strain sensor measurement results and including geometry information and material information regarding the rotor blade. In an approximation, the distance at the point in time of crossing, i.e. at the crossing point in time, may be approximated or assumed to be similar or equal to the distance as measured earlier within the predetermined angle range.

In other embodiments, the changing wind conditions may be taken into account or other changing properties may be taken into account to actually predicting the axial distance at the crossing point in time from the distance as measured or obtained or estimated at an earlier point in time.

According to an embodiment of the present invention, the controlling the airflow regulating system is such that a (axial) distance between a tip of the rotor blade and the tower, when the blade passes the tower, is equal as or greater than a predetermined minimum (axial) distance.

In particular, the axial distance may be maintained to be equal or greater than a predetermined axial minimum distance. The method may involve, instead of defining or utilizing a minimum distance, also to define a predetermined maximum deflection (or maximum strain e.g.) or maximum deviation from an axial position as designed. Thereby, collision between the blade and the tower may be avoided and a safety margin may also be provided.

According to an embodiment of the present invention, controlling the airflow regulating system comprises: adapting the airflow regulating system such that an aerodynamic lift and/or a wind resistance and/or a bending/deflection in at least a portion of the rotor blade is decreased (e.g. by between 10% and 50%), if the quantity is below the first threshold, in particular comprising effecting a stall of airflow close to at least one portion of the blade.

According to embodiments of the present invention, each wind turbine blade may be individually controlled based on respective own measurement values and respectively own determined distances between the tower and the respective rotor blade tip. In other embodiments, in order to save equipment and processing, efforts, only one wind turbine blade may be subjected to a measurement which enables to estimate and/or measure or determine the distance between this particular blade tip and the tower, while other wind turbine blades are not subjected to such measurements and/or estimations. This may in particular be applied, when all wind turbine blades are manufactured in a same design and same material. Whether collective control or individual control may be applied may depend on the particular application and circumstances, for example wind conditions and weather conditions.

According to an embodiment of the present invention, the method further comprises, after the rotor blade has passed the tower, in particular if the distance related quantity is smaller than a first threshold but is greater than a second threshold: adapting the airflow regulating system to increase the aerodynamic lift, in particular to adopt a setting as prior to passing the tower.

The setting as prior to passing the tower, i.e., the setting prior to the crossing point in time may have been memorized during the method. To return to this setting prior to the crossing point in time may advantageously put the rotor blade in an operating condition as determined for example by other control mechanisms, also dictated by desired power output. Thus, these other desired references, for example regarding power output, may be re-attained in a fast manner after the blade has passed the tower. Thereby, efficiency may be improved and controllability may also be improved. In the other case, that the quantity is even smaller than the second threshold, a deflection may be so severe, that the flow regulating device is not set back to the setting as prior to passing the tower, in order to avoid also impact or too close approach of the next rotor blade expected to pass the wind turbine tower.

According to an embodiment of the present invention, controlling the airflow regulating system comprises: moving position and/or orientation of at least one aerodynamically active surface of the airflow regulating system relative to an airfoil portion of the rotor blade.

Moving the position and/or orientation may be effected by appropriately controlling a pneumatic system for example or a piezoelectric system or a combination of the same or a hydraulic system depending on the application and the particular implementation of the flow regulating device or system. Moving for example the orientation of the aerodynamically active surface into an on-state (e.g., partly or completely swivelling out) may for example cause a localized stall of an airflow. Setting the active surface in an off-state may establish an airflow across the active surface which may be shaped according to the normal airfoil surface shape of the rotor blade.

According to an embodiment of the present invention, airflow regulating system comprises at least one of: a flap, in particular arranged at a trailing edge of the rotor blade; a, in particular segmented, spoiler arranged at a suction surface of the blade, wherein the airflow regulating system is different from a pitch angle changing system.

Thereby, conventionally available regulating systems may be supported. The spoiler may for example comprise five to ten segments which are arranged side by side along the longitudinal direction of the rotor blade and provided at or mounted at the suction side of the rotor blade.

It should be understood, that features, individually or in any combination, disclosed, described, explained or provided for a method of controlling at least one adaptable airflow regulating system may also, individually or in any combination, be applied or provided for an arrangement for controlling at least one adaptable airflow regulating system of at least one rotor blade of a wind turbine, according to embodiments of the present invention and vice versa.

According to an embodiment of the present invention it is provided an arrangement for controlling at least one adaptable airflow regulating system of at least one rotor blade of a wind turbine having a wind turbine tower, the arrangement being adapted: to determine a quantity related to a distance between the rotor blade and the wind turbine tower; and to control the airflow regulating system based on the quantity. Thereby, controlling the airflow regulating system comprises adapting the airflow regulating system such that an aerodynamic lift in at least a portion of the rotor blade is decreased, if the quantity is below a first threshold, wherein, if the distance related quantity is below a second threshold, an airflow regulating system of at least one further rotor blade is additionally controlled based on the distance related quantity, wherein the second threshold is smaller than the first threshold.

The arrangement may for example be part of a wind turbine controller and may be implemented in hardware and/or software.

According to an embodiment of the present invention it is provided a wind turbine, comprising: a wind turbine tower; a nacelle mounted on the tower; a rotor shaft installed in the nacelle at which rotor shaft plural rotor blades are mounted, at least on rotor blade having at least one adaptable airflow regulating system; and an arrangement according to the preceding embodiment connected to control the airflow regulating system.

The aspects defined above and further aspects of embodiments of the present invention are apparent from the examples of embodiment to be described hereinafter and are explained with reference to the examples of embodiment.

BRIEF DESCRIPTION

Some of the embodiments will be described in detail, with reference to the following figures, wherein like designations denote like members, wherein:

FIG. 1 schematically illustrates a wind turbine according to an embodiment of the present invention comprising an arrangement according to an embodiment of the present invention; and FIG. 2 illustrates a method scheme according to an embodiment of the present invention, as e.g., performable by the arrangement illustrated in FIG. 1.

DETAILED DESCRIPTION

The wind turbine 1 schematically illustrated in FIG. 1 comprises a wind turbine tower 3 which is erected at a not illustrated base. The wind turbine further comprises a nacelle 5 which is rotatably mounted on top of the wind turbine tower 3. The wind turbine nacelle 5 comprises a rotor shaft 7 which is installed within the nacelle 5. The rotor shaft drives a generator 9 which generates electric energy which is supplied to a converter 11 which converts the variable frequency AC power stream to a substantially fixed frequency power stream which is provided to a wind turbine transformer which transforms the output voltage to a higher value.

The wind turbine 1 further comprises an arrangement 20 of controlling at least one adaptable airflow regulating system 13 which is provided at at least one wind turbine blade 15. Therein, the rotation shaft 7 has a hub 17 at which plural rotor blades 15 are mounted. At least one rotor blade has a flow regulating system 13.

In the illustrated embodiment, the flow regulating system comprises a segmented spoiler having spoiler segments 19a, 19b, 19c, 19d, 19e, 19f which are arranged on a suction side 14 along a longitudinal axis 21 of the rotor blade 15. The airflow regulating system 13 may further comprise at least one flap at a trailing edge 16, wherein flaps are indicated with reference sign 23.

The arrangement 20 is adapted to control the adaptable airflow regulating system 13. Thereby, the arrangement 20 performs a method 30 as is illustrated in FIG. 2. In a method step 31, a quantity related to a distance between the rotor blade and the wind turbine tower is determined. In particular, the distance may relate to an axial distance "da" between a rotor blade tip 25 and a portion 27 of the wind turbine tower 3. The portion 27 of the wind turbine tower is in particular a front portion of the wind turbine tower 3 which is by a predetermined distance below the rotor shaft 7, wherein this distance may correspond to the entire length of the rotor blade 15. In a further method step 33, the airflow regulating system, for example system 13 illustrated in FIG. 1, is controlled based on the quantity.

As is illustrated in FIG. 1, the wind turbine further comprises a radar measurement system 28 which is capable of measuring the axial distance da between the tower at the area 27 and the rotor blade tip 25. Thereby, the radar measurement system 28 may for example be configured as described in WO 2020/057917. The radar system 28 may comprise a receiver and a transmitter 35, 37 which may on one hand generate an electromagnetic signal which is fed into a waveguide 39 which may be configured as a leaky feeder. The electromagnetic signal travels within the leaky feeder 39 which comprises openings or holes which allow the electromagnetic wave to leak through the waveguide 39 or leaky feeder 39 to an outside. The electromagnetic wave may then be reflected by for example a portion of the rotor blade 15 and the reflected signal may travel through the guide 39 towards the receiver 37 which receives the reflected electromagnetic wave. Based on radar technology, the position of for example the rotor blade tip 25 can be determined. Furthermore, based on positioning information regarding the outer surface of the wind turbine tower, the distance da between the rotor blade tip 25 and the area 27 of the tower 3 may be determined by the arrangement 20 which receives measurement signals from the radar system 28, for example via a data transmission line 41.

The rotor blade 15 has further installed several strain sensors or acceleration sensors 43 along its longitudinal extent or at least at a root portion 12. The arrangement 20 further receives measurement signals from the acceleration sensors or strain sensors 43 and determines from these measurement sensors a deflection of the rotor blade 15. From the deflection of the rotor blade, also the distance da may be calculated or predicted or estimated. In other embodiments, the distance da may be determined using LIDAR or other suitable distance measurement techniques.

The arrangement 20 may for example be arranged within the hub 17 of the wind turbine or may be arranged within the nacelle 5 depending on the application.

FIG. 1 illustrates the point in time when the rotor blade 15 is crossing or passing the tower 3. The measurement or estimation however may occur earlier than at the crossing point in time, i.e. at a point in time which is before the crossing point in time. Thereupon, the measurement may relate to the position of the rotor blade or in particular the tip of the rotor blade 25 at a point in time before passing the wind turbine tower. However, based on the distance of the rotor blade tip from a plane 45 perpendicular to the rotor axis 8 of the rotor 7, the distance da at the crossing point in time may be inferred. Therein, the plane 45 is perpendicular to the rotation axis 8 of the rotor 7 and intersects the wind turbine tower 3 at the location 27. In a first approximation, it may be assumed that the distance of the tip in the axial direction 8 from the plane 45 does not significantly change upon further rotating for passing the wind turbine tower 3. The distance of the tip 25 of the rotor blade from the plane 45 may for example be measured in an azimuthal axial angle range which lies before the blade passes the tower 3.

The axial distance da may also be inferred from measurement signals of the plural strain sensors or acceleration sensors 43 and appropriately processing these measurement signals.

The arrangement 20 then controls the flow regulating system 19a, 19b, 19c, 19d, 19e, 19f and/or 23 by supplying appropriate control signals, for example via a control line 47 to the individual segments 19a, . . . , 19f and control lines 48 to flaps 23. These segments 19a-19f may then individually turned on or off, for example if they comprise two distinguished or discrete states. In other embodiments, additionally or alternatively, a continuous adaptation of the flow regulating device 13 may be performed, for example by continuously moving an orientation and/or position of the trailing edge flaps 23. By controlling the airflow regulating system 13 by the arrangement 20 it is ensured that the distance da is not smaller than a minimum distance dmin.

If the determined distance da is relatively large, for example larger than a first threshold, the add-on adaptation may not be performed. However, if the determined distance or the axial distance da is below a first threshold, then the arrangement 20 may control the airflow regulating device to reduce its lift force. The arrangement may perform a collective control of all airflow regulating devices of all wind turbine blades based on a single or several measurements or determinations of distances.

According to embodiments of the present invention, flow regulating devices of different rotor blades may be differently controlled, for example not at same time intervals. For example, the flow regulating device or system of one rotor blade may only be controlled just before the crossing point in time, during the crossing point in time and just after the crossing point in time, while all other wind turbine regulating or airflow regulating device of other rotor blades are not controlled in this time window. In this embodiment, thus, flow regulating devices of different rotor blades may be controlled in different time ranges. However, the control may be similar or even equal, regarding reduction of lifting force due to adaptation of the respective flow regulating device.

In other embodiments of the present invention, no individual control is performed but a collective control, which may simplify the algorithm.

Each of the spoiler segments 19a, . . . , 19f has a respective aerodynamically active surface which is exposed to the airflow around the rotor blade 15. This active surface is moved regarding position and/or orientation due to the control signals supplied from the arrangement 20.

Embodiments of the present invention utilize active blade add-ons to control blade deflection and hence ensure blade tip to tower clearance as required.

The pitch systems of larger turbines may typically be relatively slow (capable of pitching at a slower rate) than an add-on (i.e., airflow regulating system). This means, that pitch systems may act slower to rapid events than add-ons. Furthermore, pitching may involve rotating the entire blade and also airfoils near the blade root that has a minimal aerodynamic impact. Thus, pitching may be less efficient than utilizing add-ons to control blade deflection and thus ensure a minimum distance between rotor blade tip and tower.

Active blade add-ons, such as a spoiler (in particular segmented) and/or a trailing edge flap, may be capable of effecting a significant change to the lift of the rotor blade in a short time.

The following steps illustrate particular embodiments of the present invention but are not restricting embodiments of the invention:

1) First, information about a blade tip to power distance is determined. This may include
   a. a measurement of the tip-to-tower distance
   b. a measurement of the tip deflection
   c. an estimate of the tip-to-tower distance
   d. an estimate of the tip deflection.
   The measurements may be based on radar, lidar, etc. Estimation may be based on blade root moments, sensor signals (for example accelerometer signals) in the blade, extrapolations of measurements, etc. There may be a strong correlation between the blade deflection and the blade tip to tower clearance or blade tip to tower distance.
   The deflection may only be evaluated in a certain rotor azimuth range (for example in a sector of 90-180° before the blade passes the tower). The deflection may be evaluated as the predicted distance when the blade passes the tower. Embodiments of the present invention may allow an arbitrary deflection or arbitrary position of the blade tip when the blade is not in front of the tower (i.e. is not passing the tower). However, practically, the blade deflection prior to passing the tower is of course also having an impact of what the deflection will be later when it passes the tower.

2) Determine an appropriate control action command based on the information. This may include:
   a. apply a collective control action to all blades if a threshold is exceeded.
   b. apply an individual control action to a single blade exceeding a threshold.
   c. continuously apply a control action of a more severe kind whenever the information indicates a smaller clearance (or distance)—likely first reacting when the clearance is below a certain limit.

3) Move the active blade add-on according to the appropriate control action command. This may include:
   a. activate a spoiler (or deactivate a spoiler) or activate at least one spoiler segment or deactivate some spoiler segments
   b. activate or deactivate trailing edge flap
   c. activate other add-on(s)

Embodiments of the present invention may provide several advantages such as:

Applying an active blade add-on may be an efficient way of unloading the rotor blade to reduce blade deflection.

Pitching an entire blade or all blades may be a less efficient way of unloading blade to reduce blade deflection.

Blade tip to tower clearance (or distance) is typically design-driven and may cause higher LCOE, because the turbine components are designed to provide clearance from added cost/material or by sacrificing performance.

Improved ability to produce cost competitive turbines.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling at least one adaptable airflow regulating system, of a rotor blade of a wind turbine having a wind turbine tower, the method comprising:
   determining a quantity related to a distance between the rotor blade and the wind turbine tower;
   controlling the airflow regulating system based on the quantity,
wherein controlling the airflow regulating system comprises:
   adapting the airflow regulating system such that an aerodynamic lift in at least a portion of the rotor blade is decreased, if the quantity is below a first threshold,
   wherein controlling the airflow regulating system includes moving position and/or orientation of an aerodynamically active surface of the airflow regulating system relative to an airfoil portion of the rotor blade,
the method further comprising, if the distance related quantity is below a second threshold:
   additionally controlling a further airflow regulating system of at least one further rotor blade based on the distance related quantity,
   wherein the second threshold is smaller than the first threshold.

2. The method according to claim 1,
   wherein the distance related quantity is obtained by at least one measurement and/or at least one estimation
   wherein the distance relates to an axial distance between a tip of the rotor blade and the tower, the axial distance being taken along an axial direction of a wind turbine rotor at which the rotor blade is mounted.

3. The method according to claim 2, wherein the at least one measurement involves at least one of:
   measuring a distance between a portion of the rotor blade and a portion of the tower;
   measuring a deflection of the rotor blade in at least one portion of the rotor blade,
wherein the measuring is based on RADAR and/or LIDAR and/or strain measurement and/or acceleration measurement.

4. The method according to claim 2, wherein the estimation involves at least one of:
   estimating a deflection of at least one portion, in particular a blade tip, of the rotor blade based on at least one measurement result
   estimating a distance between a portion of the rotor blade and a portion of the tower based on at least one measurement result and/or estimation result.

5. The method according to claim 1, wherein determining the distance related quantity comprises:
   measuring the distance related quantity for a first point in time;
   predicting the distance related quantity for a second point in time based on the distance related quantity as measured for the first point in time;
wherein controlling the airflow regulating system comprises:
   controlling, before the second point in time, the airflow regulating system based on the quantity as predicted for the second point in time.

6. The method according to claim 2, wherein the at least one measurement and/or the at least one estimation relates to the rotor blade being positioned within a predetermined rotor azimuth angle range, in a moving direction of the rotor blade before the tower.

7. The method according to claim 1, wherein determining the distance related quantity comprises:
   measuring a blade deflection, when the blade is within the predetermined rotor azimuth range, and
   estimating an axial distance between a tip of the blade and the tower, at the point in time when the blade tip passes the tower, based on the blade deflection measured earlier.

8. The method according to claim 1, wherein the controlling the airflow regulating system is such that a distance between a tip of the rotor blade and the tower, when the blade passes the tower, is equal as or greater than a predetermined minimum distance.

9. The method according to claim 1, wherein controlling the airflow regulating system comprises:
   adapting the airflow regulating system such that a wind resistance and/or a bending/deflection in at least a portion of the rotor blade is decreased, if the quantity is below the first threshold.

10. The method according to claim 1, further comprising, after the rotor blade has passed the tower:
    adapting the airflow regulating system to increase the aerodynamic lift.

11. The method according to claim 1, wherein the airflow regulating system comprises:
    a flap; and/or
    a spoiler arranged at a suction surface of the rotor blade,
wherein the airflow regulating system is different from a pitch angle changing system.

12. An arrangement for controlling an adaptable airflow regulating system of a rotor blade of a wind turbine having a wind turbine tower, the arrangement being adapted:
    to determine a quantity related to a distance between the rotor blade and the wind turbine tower; and
    to control the airflow regulating system based on the quantity,
wherein controlling the airflow regulating system comprises:
    adapting the airflow regulating system such that an aerodynamic lift in at least a portion of the rotor blade is decreased, if the quantity is below a first threshold,
    wherein controlling the airflow regulating system includes moving position and/or orientation of an aerodynamically active surface of the airflow regulating system relative to an airfoil portion of the rotor blade,
    wherein, if the distance related quantity is below a second threshold, an airflow regulating system of at least one further rotor blade is additionally controlled based on the distance related quantity,
wherein the second threshold is smaller than the first threshold.

13. A wind turbine, comprising:
a wind turbine tower;
a nacelle mounted on the tower;
a rotor shaft installed in the nacelle at which rotor shaft plural rotor blades are mounted, at least on rotor blade having at least one adaptable airflow regulating system; and
the arrangement according to claim 12 connected to control the airflow regulating system.

14. A method of controlling an airflow regulating system of a rotor blade of a wind turbine having a wind turbine tower, wherein the airflow regulating system comprises a flap and/or a spoiler, and wherein the airflow regulating system is different from a pitch angle changing system, the method comprising:
determining a quantity related to a distance between the rotor blade and the wind turbine tower;
controlling the airflow regulating system based on the quantity, wherein controlling the airflow regulating system comprises:
adapting the airflow regulating system such that an aerodynamic lift in at least a portion of the rotor blade is decreased, if the quantity is below a first threshold,
additionally controlling a further airflow regulating system of at least one further rotor blade based on the distance related quantity, if the distance related quantity is below a second threshold, wherein the second threshold is smaller than the first threshold.

* * * * *